8600X
J. Mulford,
Bending Wood,
Patented Jan. 16, 1835.
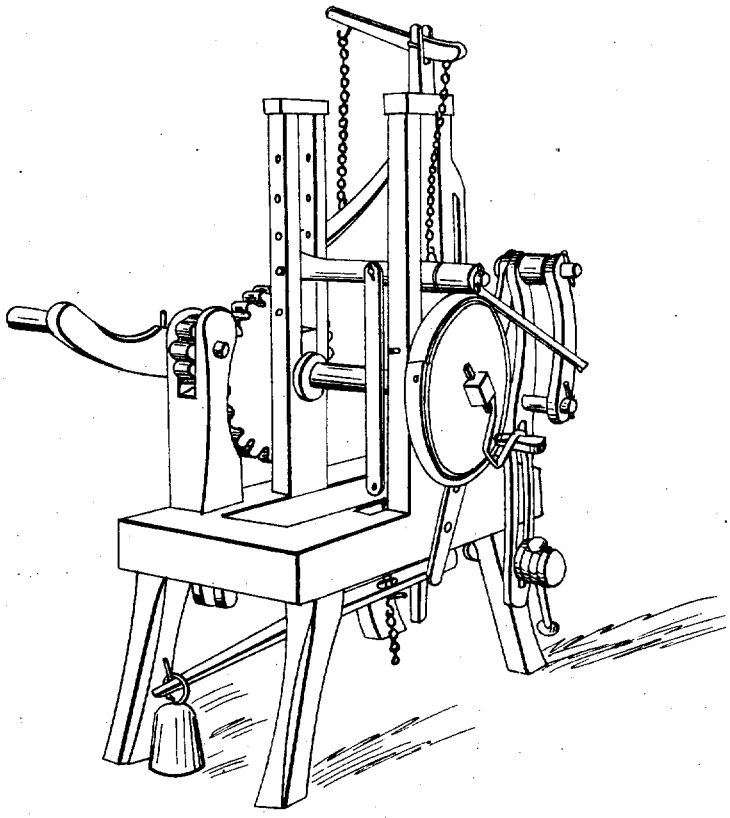
AM. PHOTO-LITHO. CO. N.Y. (OSBORNE'S PROCESS)

Jan. 16. 1835 40

8600X

Jonathan Mulford, Northern Liberties Philadelphia, Penn.

Letters Patent.

The schedule referred to in these Letters Patent and making part of the same containing a description in the words of the said Jonathan Mulford himself of his improvement in a Machine for bending Mast and Truss hoops.

To all to whom these presents shall come,

Be it known that I, Jonathan Mulford, of the District of the Northern Liberties of the City of Philadelphia, and State of Pennsylvania, have invented a new and useful machine, for bending Mast & Truss Hoops, and that the following is a full and exact description of the construction and operation of the said Machine as invented by me — to wit.

The frame to which the several parts of the machine are attached and on which they rest, is formed of four pieces of timber making an oblong square, & resting on four legs about two feet in height: to this frame is attached, opposite to each other, two perpendicular pieces of timber, on which the main shaft in passing through, revolves — to the end of this shaft, is attached a pulley or chuck, on which the hoop is bent — the hoop pole is secured on said pulley or chuck by a wedge in the rim, as also by another shaft, regulated to the pressure required, by a compound or double lever — this shaft is fixed above the main shaft and has a roller at the extremity (immediately over said chuck) which acts on the hoop pole so as to keep it from slipping or departing from the rim of said chuck or pulley — the rotary motion of said main shaft is performed by a crank, attached thereto with two cog wheels passing into each other, so that the hoop pole being secured on the circular chuck or pulley, and the main shaft being turned, the hoop pole is bent into the form required — there is also attached to the frame on the same side as the pulley or chuck, a frame with a roller fixed so as to form a guide for the hoop pole in passing on to the chuck or pulley — The pole passing under the said roller, on the pulley or chuck. —

Witnesses..

W. Wilkinson }
Levi D. Belair }

(Drawing)

Jonathan Mulford 392 1.9

(Drawing)

[illegible]